US011990827B2

(12) United States Patent
Soleno et al.

(10) Patent No.: US 11,990,827 B2
(45) Date of Patent: May 21, 2024

(54) CURRENT BALANCING FOR INTERLEAVED POWER STAGES

(71) Applicant: AES Global Holdings PTE Ltd., Singapore (SG)

(72) Inventors: Antonio Remetio Soleno, Mandaluyong (PH); Jessica Cabiles Magsino, Pasig (PH)

(73) Assignee: AES Global Holdings PTE Ltd., Singapore (SG)

(*) Notice: Subject to any disclaimer, the term of this patent is extended or adjusted under 35 U.S.C. 154(b) by 174 days.

(21) Appl. No.: 17/648,746

(22) Filed: Jan. 24, 2022

(65) Prior Publication Data

US 2023/0238882 A1 Jul. 27, 2023

(51) Int. Cl.
*H02M 3/158* (2006.01)
*H02M 1/00* (2006.01)

(52) U.S. Cl.
CPC ....... *H02M 1/0025* (2021.05); *H02M 3/1586* (2021.05)

(58) Field of Classification Search
CPC . H02M 3/1586; H02M 3/1584; H02M 1/0025
See application file for complete search history.

(56) References Cited

U.S. PATENT DOCUMENTS 6,278,263 B1 8/2001 Walters et al.
6,670,794 B1 12/2003 Wang et al.
11,196,345 B1 12/2021 Boncato et al.
2004/0046535 A1* 3/2004 Duffy .................... H02M 3/157 323/283
2010/0238060 A1* 9/2010 Nien ..................... H03M 1/203 341/155
2013/0214751 A1 8/2013 Shiraishi et al.
2023/0006550 A1* 1/2023 Sreenivas ........... H02M 3/1566

FOREIGN PATENT DOCUMENTS

EP 2945267 A2 11/2015

OTHER PUBLICATIONS

International Search Report & Written Opinion for PCT Application No. PCT/SG2023/050045, dated May 8, 2023; 10 pages.

* cited by examiner

*Primary Examiner* — Alex Torres-Rivera

(57) ABSTRACT

A multi-rail power converter assembly includes first and second interleaved power converters configured to output first and second rail currents. A control driver circuit includes first and second control outputs configured to output first and second control signals configured to control power conversion in the first and second power converters to generate the first and second rail currents. A first PWM generator receives a compensator control signal and generates the first control signal based on the compensator control signal. A second PWM generator receives a first modified compensator control signal and generates the second control signal based on the first modified compensator control signal. The control driver circuit is configured to generate the first modified compensator control signal based on an average of the first rail current and the second rail current.

18 Claims, 7 Drawing Sheets

CURRENT BALANCING FOR INTERLEAVED POWER STAGES

TECHNICAL FIELD

Aspects of the disclosure relate to output power distribution, and more particularly to balancing currents in multi-rail power supply interleaved stages.

BACKGROUND

DC/DC converters may employ one or more power conversion technologies to convert an input voltage at a first power level to an output voltage at a second power level. Such power conversion technologies may include any suitable power conversion topology having one or more power switching devices. For example, the power converters may include one or more of a buck topology, a boost topology, a buck-boost topology, a forward topology, a flyback topology, a half bridge topology, a full bridge topology, and/or their resonant counterparts.

FIG. 1 illustrates a multi-rail interleaved power supply 100 having multiple DC/DC power converters 101, 102 coupled together in an interleaved arrangement. A voltage input 103 is coupled to provide the DC/DC power converters 101, 102 with an input voltage having a first voltage level. A voltage output 104 provides an output voltage based on a conversion of the input voltage to the output voltage at a second voltage level. The power converters 101, 102 are phase shifted relative to each other such that a conduction period of one power converter is at least partially complementary to an idle period of the other power converter and vice versa.

A converter driver 105 is illustrated implementing a drive scheme that delivers a common control signal 106 from a compensator 107 to each PWM driver 108, 109 for generating PWM control signals 110, 111 for driving the one or more switches in the DC/DC power converters 101, 102. While the common control signal 106 is delivered to each of the PWM drivers 108, 109, the oscillator of one of the PWM drivers 108, 109 may be 180° out of phase with the other oscillator.

Such multiphase power supply design enables the power supply 100 to operate at increased power levels. Interleaving of power stages offers benefits such as, for example, reduced RMS current in the input capacitors, ripple current cancellation in the output capacitors, improved transient response as a result of reduced output filter inductance, separation of heat-generating components allowing for reduced heatsink requirements, and improved form factor for low profile solution.

However, a challenge exists in generating current balance among the rails. In the single, common control signal control scheme illustrated in FIG. 1 where the control signal 106 is provided to the multiple phase-shifted PWM drivers 108, 109, equal current sharing between the rails may not be experienced. That is, even though the duty cycle for the PWM control signals 110, 111 could be made equal (but out of phase), current imbalance between the rails may still exist caused by the components and parameters external to any circuit controllers (e.g., DSP, ASIC, etc.). For example, contributors of the current imbalance may be: (1) mismatch of the switch driver propagation delays; (2) mismatch of DC resistances, such as DC resistance of inductors, RDSON of MOSFETs and PCB track resistances; and (3) forward voltage drop of diodes.

For example, FIG. 2 illustrates a plot of simulated rail currents 200, 201 of Rail1 and Rail2, respectively, of the multi-rail power supply (e.g., the power supply 100) of FIG. 1 using the common control signal scheme illustrated in FIG. 1. The simulated rail currents 200, 201 illustrate a current mismatch between the rails of up to 23% from a target current 202 when simulated to include mismatches in the contributors described above. Such unequal currents between the rails produces unequal power dissipations between the rails, which results in unequal thermal management and reduction of power supply efficiency.

It would be advantageous to control the power conversion of the power converters of an interleaved, multi-rail power supply by a control scheme that overcomes the aforementioned drawbacks.

OVERVIEW

In accordance with one aspect of the present disclosure, a multi-rail power converter assembly includes a first power converter comprising a first rail and configured to receive an input voltage and to output a first rail current on the first rail based on the input voltage, a second power converter comprising a second rail, and a control driver circuit. The second power converter is interleaved with the first power converter and configured to receive the input voltage and to output a second rail current based on the input voltage. The control driver circuit includes a first control output configured to output a first control signal configured to control power conversion of the input voltage in the first power converter to generate the first rail current and includes a second control output configured to output a second control signal control power conversion of the input voltage in the second power converter to generate the second rail current. The control driver circuit also includes a first pulse-width modulation (PWM) generator configured to receive a compensator control signal and to generate the first control signal based on the compensator control signal and includes a second PWM generator configured to receive a first modified compensator control signal and to generate the second control signal based on the first modified compensator control signal. The control driver circuit is configured to generate the first modified compensator control signal based on an average of the first rail current and the second rail current.

In accordance with another aspect of the present disclosure, a method for balancing rail currents in a multi-rail power supply includes generating a first pulse-width modulation (PWM) control signal based on a compensator control signal, controlling a first power converter via the first PWM control signal to generate a first rail current based on an input voltage, and generating a second PWM control signal based on a combination of the compensator control signal with a first compensation signal. The method also includes controlling a second power converter via the second PWM control signal to generate a second rail current based on the input voltage and generating the first compensation signal based on an average of the first and second rail currents. The second power converter is interleaved with the first power converter.

BRIEF DESCRIPTION OF THE DRAWINGS

The drawings illustrate embodiments presently contemplated for carrying out the invention.

In the drawings.

Figure 1:
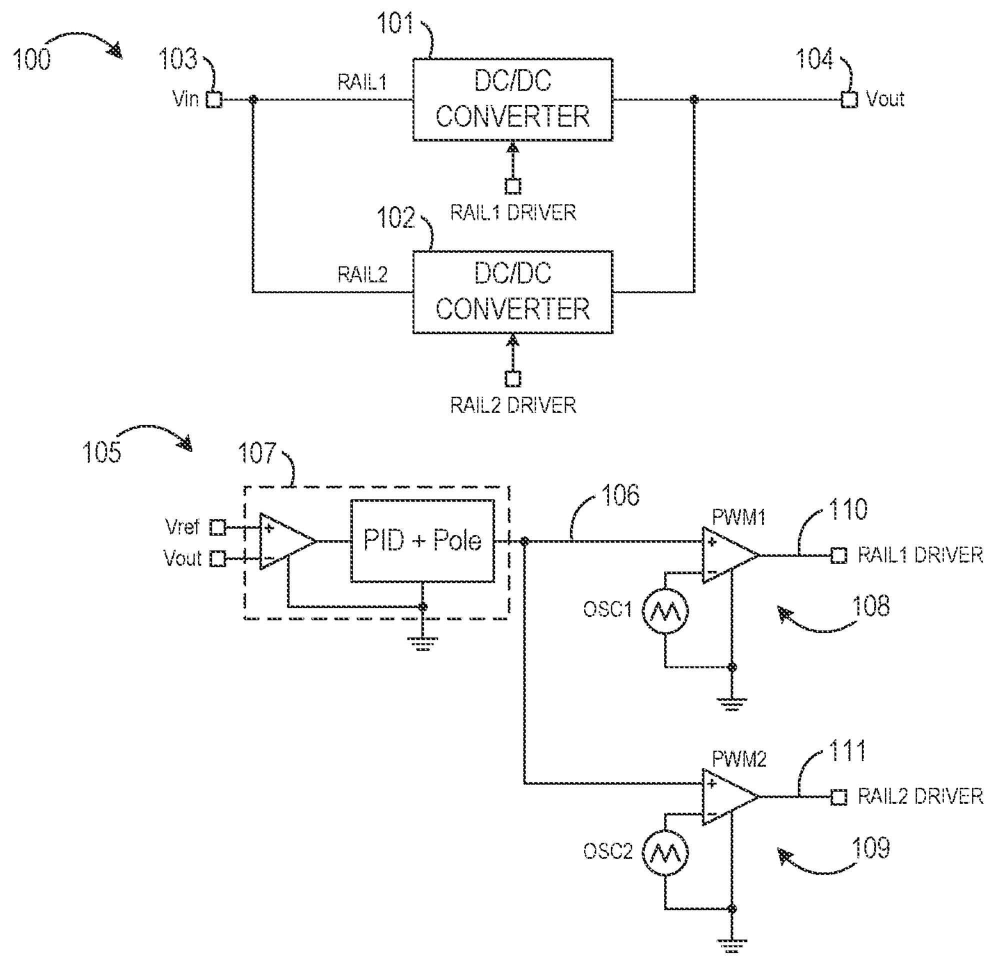
FIG. 1 is a schematic block diagram of a multi-rail power supply controlled via a common control signal scheme according to an example.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 3:
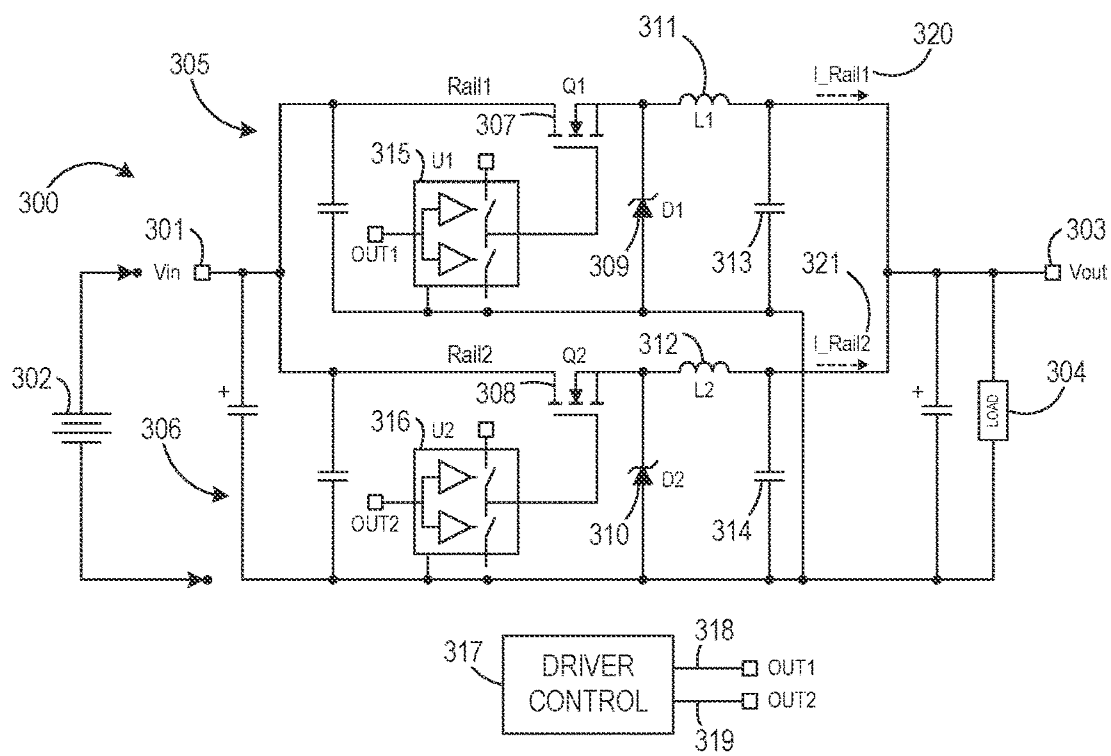
FIG. 3 is a schematic diagram of a multi-rail power supply according to an embodiment.

An interleaved power converter 300 is illustrated in FIG. 3 according to an example embodiment of the present disclosure. The power converter 300 includes a voltage input 301 having an input terminal for receiving an input voltage from a voltage source 302 and has a voltage output 303 having an output terminals for supplying an output voltage to a load 304.

The power converter 300 includes two voltage converters 305, 306 implemented, in the embodiment of FIG. 3, according to the buck topology. However, implementation of the voltage converters 305, 306 as any additional power converter topology such as a boost topology, a buck-boost topology, a forward topology, a flyback topology, a half bridge topology, a full bridge topology, and/or their resonant counterparts is contemplated herein as this disclosure is not limited to a buck topology. Each voltage converter 305, 306 includes a controllable switch 307-308 (e.g., a MOSFET or other gate-controlled transistor), a diode 309-310 (or a synchronous rectifier, e.g, a MOSFET), an inductor 311-312, and a capacitor 313-314. A switch driver 315, 316 controls the conducting and non-conducting states (e.g., on and off modes) of the switches 307, 308 to convert the higher input voltage to a lower output voltage.

A driver control 317 generates control signals 318, 319 that are supplied to the switch drivers 315, 316. The control signals 318, 319 are pulse-width modulated (PWM) signals configured to cause the switch drivers 315, 316 to generate rail currents 320, 321. As described herein, generation of the rail currents 320, 321 according to the control scheme(s) detailed below reduce average current imbalance between the rail currents 320, 321.

Figure 4:
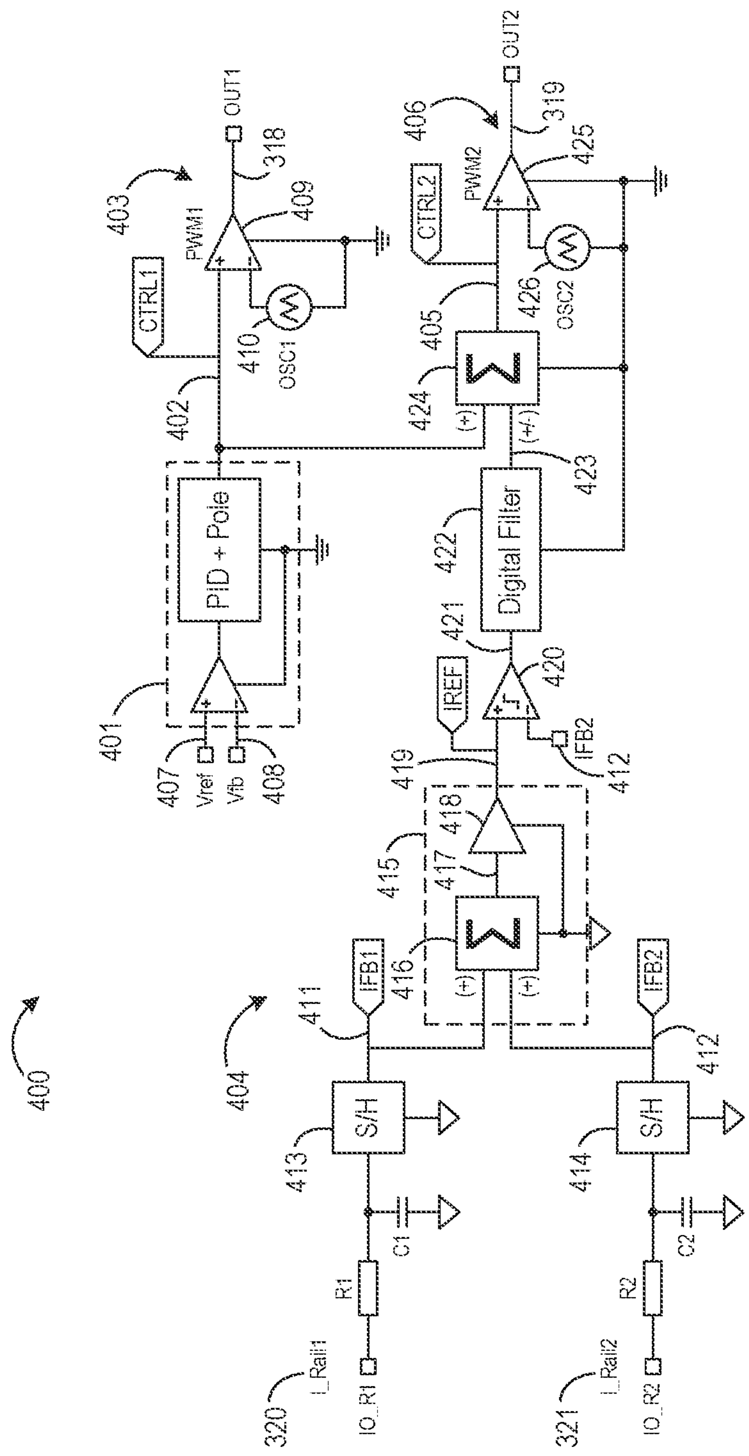
FIG. 4 is a schematic block diagram of a multi-rail power supply current balancing control scheme according to an embodiment.

FIG. 4 is a schematic block diagram of a multi-rail power supply current balancing control scheme 400 according to an embodiment. Referring to FIGS. 3 and 4, a voltage loop control 401 is configured to generate a compensator control signal 402 provided to a PWM driver 403 for generating the PWM control signal 318 (e.g., OUT1) for controlling the voltage converter 305. The compensator control signal 402 is also provided to a current balancing control 404 that adjusts the compensator control signal 402 to generate a modified or adjusted compensator control signal 405 provided to a PWM driver 406 for generating the control signal 319 (e.g., OUT2) for controlling the voltage converter 306. The voltage loop control 401 receives a voltage reference signal 407 and a voltage feedback signal 408 and, based on a comparison of the voltage reference signal 407 and the voltage feedback signal 408, generates the compensator control signal 402 designed to adjust the output voltage of the power converter 300 toward the reference voltage.

As shown, the PWM driver 403 receives the compensator control signal 402 and, via a comparator 409 and an oscillator 410 generating a triangle or saw-tooth signal, generates the PWM control signal 318. To avoid current imbalance between the rail currents 320, 321, the current balancing control 404 receives the common compensator control signal 402 from the compensator control signal 402 and modifies it based on the rail currents 320, 321 to balance the rail currents 320, 321.

To modify the compensator control signal 402, the current balancing control 404 receives the rail currents 320, 321 and generates respective current feedback signals 411, 412 (e.g., IFB1 and IFB2). In one embodiment, the rail currents 320, 321 are digitized by sample-and-hold functions 413, 414. An averaging function 415 includes a summing function 416 configured to sum the current feedback signals 411, 412 together to create a sum signal 417. A dividing function 418 generates a current reference signal 419 (e.g., IREF) by dividing the sum signal 417 by the total number of rail currents received, which, in one example, equals the number of controlled voltage converters.

A reference comparison circuit 420 having, for example, a comparator, generates a reference comparison signal 421 by comparing the current reference signal 419 with the current feedback signal 412 for the power converter (e.g., voltage converter 306) for which the compensator control signal 402 is to be adjusted. A digital filter 422 may be configured to filter the reference comparison signal 421 to, for example, account for sampling delays in generating digitized current feedback signals 411, 412. A current compensation signal 423 representing the reference comparison signal 421, unfiltered or filtered if the digital filter 422 is used, summed by a compensator control signal summing function 424 with the compensator control signal 402 to generate the modified compensator control signal 405. Based on the relationship of the current feedback signal 412 with the current reference signal 419, the reference comparison signal 421 may be positive or negative. Thus, when summed, the compensator control signal 402 may be increased or decreased by the reference comparison signal 421 such that the modified compensator control signal 405 may be greater than or less than the compensator control signal 402. If the rail current feedback (e.g., the current feedback signal 412 or IFB2) is higher than the target current level (e.g., the current reference signal 419 or IREF), the correction signal (e.g., the reference comparison signal 421) is negative, which means a decrease of duty cycle of the PWM control signal 319. On the other hand, if the rail current feedback is lower than the target current level, the correction signal is positive, which means an increase of duty cycle of the PWM control signal 319. With such automatic adjustment, there is no need to identify beforehand which particular rail is giving higher current or which rail is providing lesser current. The PWM driver 406 receives the modified compensator control signal 405 and, via a comparator 425 and an oscillator 426 generating a triangle or saw-tooth signal, generates the PWM control signal 319.

Thus, the current balancing control scheme 400 uses a distinct control signal per phase (e.g., compensator control signal 402 for phase 1 and modified compensator control signal 405 for phase 2) instead of providing a common control signal to both PWM drivers 403, 406. The first rail does not need to be corrected while all the other used rails will balance naturally. That is, the rail (e.g., Rail1) that has no correction uses the raw compensator control signal 402 while the rail (e.g., Rail2) that has the correction uses the modified compensator control signal 405). While Rail2 is shown in FIG. 4 as having the correction added thereto, the correction could instead be added to Rail1 while Rail2 would use the raw compensator control signal 402. If added to Rail 1, the reference comparison circuit 420 would compare the current reference signal 419 with the Rail1 current feedback IFB1 (e.g., the current feedback signal 411) rather than the Rail2 current feedback IFB2 as shown.

Figure 2:
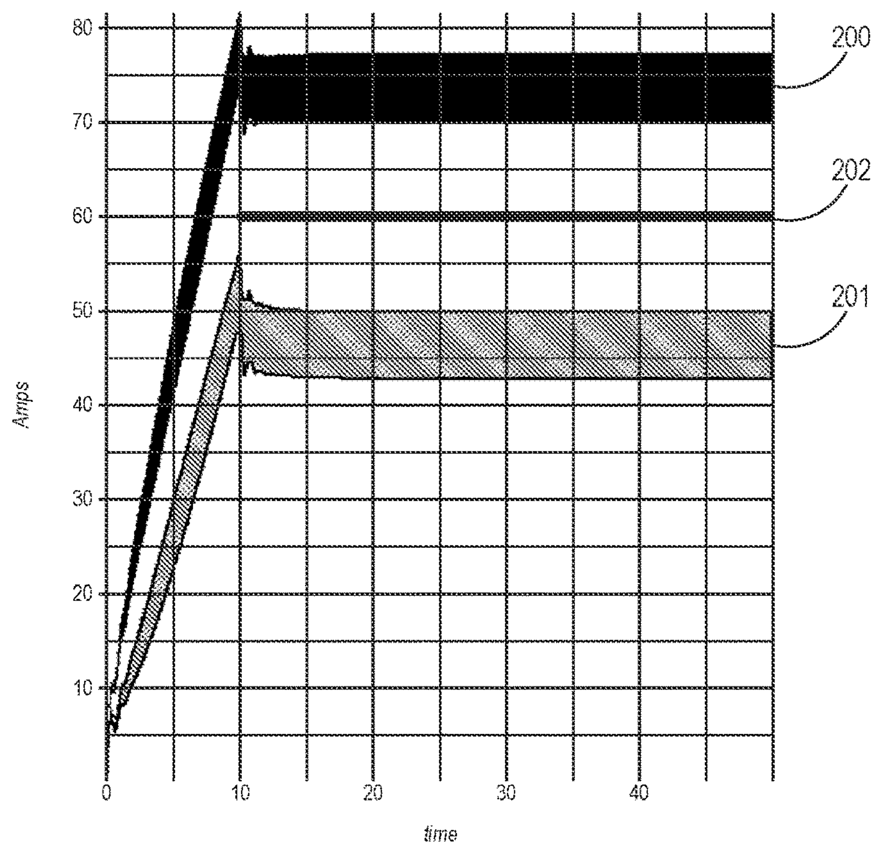
FIG. 2 is a plot illustrating rail inductor currents simulated in the multi-rail power supply using the common control signal scheme of FIG. 1 according to an example.
Figure 5:
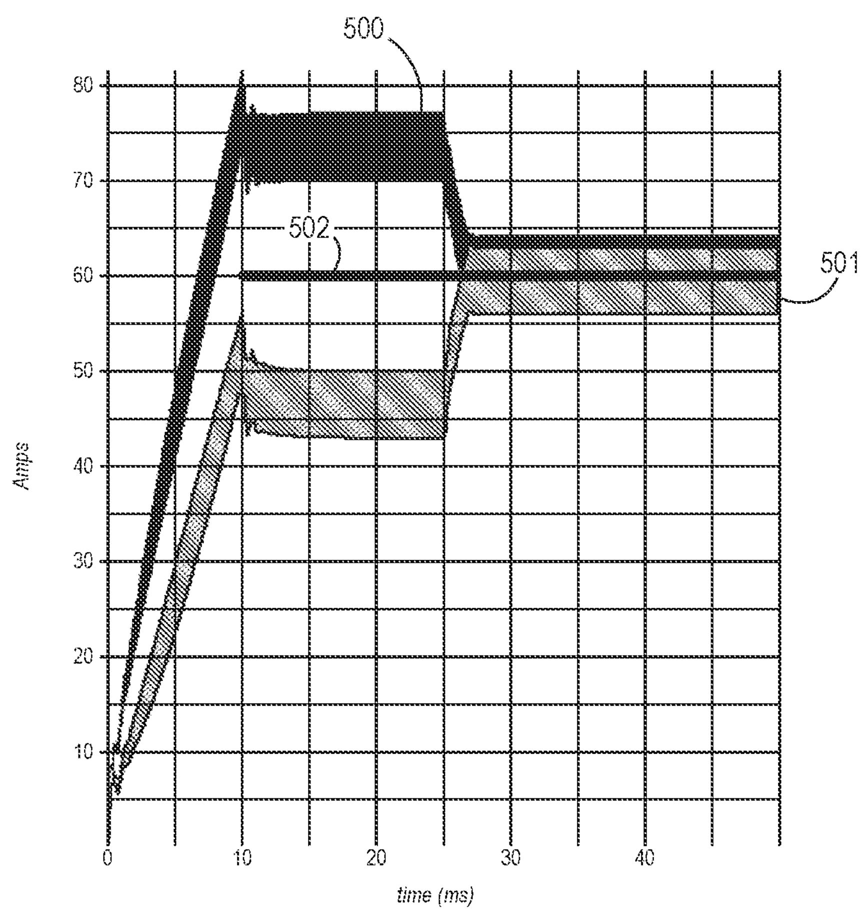
FIG. 5 is a plot illustrating rail inductor currents simulated in the multi-rail power supply of FIG. 3 based on implementation of the current balancing control scheme of FIG. 4 according to an embodiment.

FIG. 5 illustrates a plot of simulated rail currents 500, 501 of Rail1 and Rail2, respectively, of the multi-rail power supply/converter 300 of FIG. 3 using distinct control schemes according to an example. Between 0 ms. and 25 ms., the simulated rail currents 500, 501 illustrate an implementation of the common control signal control scheme discussed with respect to FIGS. 1 and 2 to contrast rail current effects between the common control signal control scheme and the current balancing control scheme disclosed in embodiments herein. The simulated rail currents 500, 501 exhibit a current imbalance of greater than 20% from the target current 502 when using the common control signal control scheme. At 25 ms., the simulation shows a control change from the common control signal control scheme to the current balancing control scheme to illustrate a reduction of current imbalance by incorporating aspects of this disclosure. Based on the simulated current imbalance reduction, accuracy of current sharing between the rails of less than 1% can be achieved by implementing the current balancing control scheme disclosed herein. An average current of each rail can thus be within 1% of a target output current.

Figure 6:
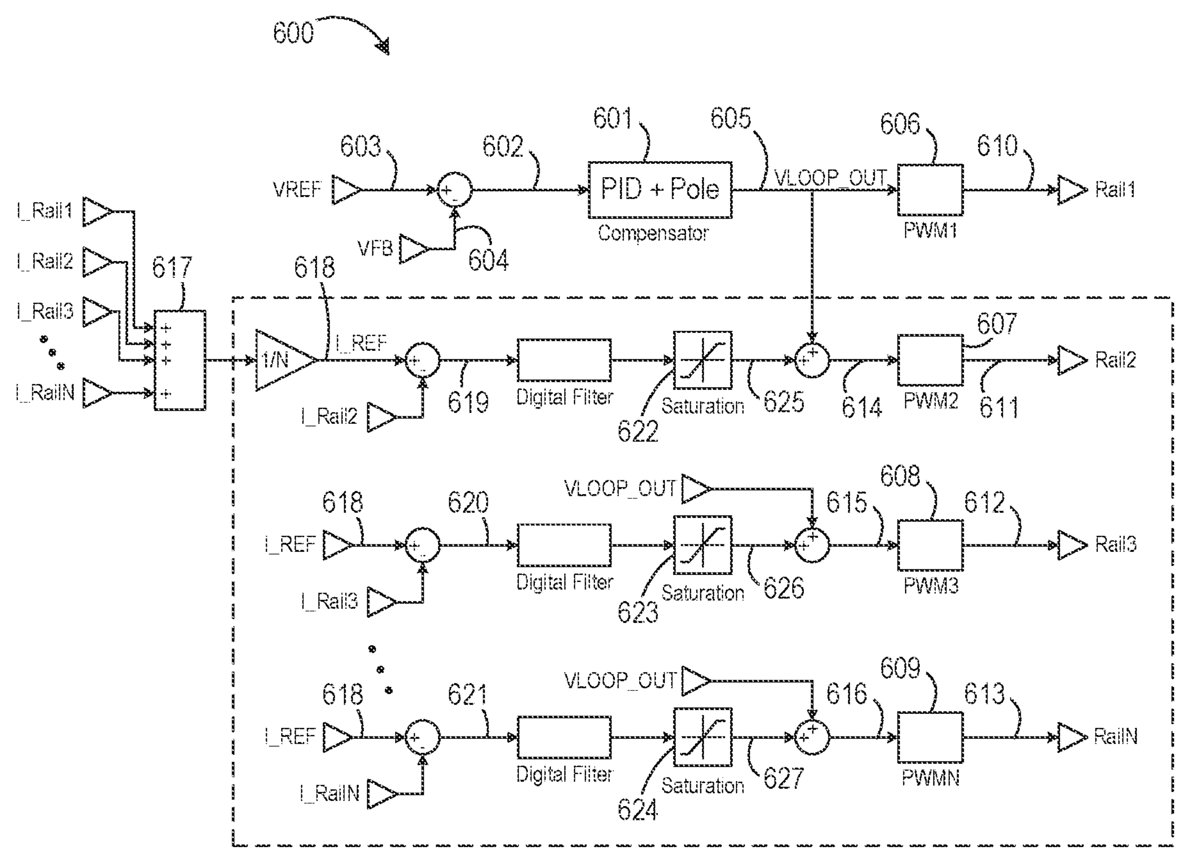
FIG. 6 is a block diagram illustrating the current balancing control scheme of FIG. 4 according to another embodiment.

While the embodiments illustrated in FIGS. 3-5 refer to two interleaved power converters, current balancing among a greater number of interleaved power converters is available through implementation of the disclosure herein. FIG. 6 illustrates a block diagram illustrating a digital/software implementation 600 of the current balancing control scheme of FIG. 4 with N interleaved converters usable by a multi-rail interleaved power supply according to another embodiment.

A compensator 601 receives a feedback comparison signal 602 based on a comparison of a voltage reference signal 603 with a voltage feedback signal 604. The voltage feedback signal 604 is a digitized signal of the output voltage. Based on the feedback comparison signal 602 the compensator 601 generates a raw control signal 605 (VLOOP_OUT) used by each of the PWM driver 606, 607, 608, 609 to generate their respective PWM control signals PWM control signal 610, 611, 612, 613. While the PWM driver 606 of Rail1 uses the raw control signal 605 directly to generate its PWM control signal 610, the PWM drivers 607, 608, 609 of Rail2, Rail3, and RailN receive a modified control signal 614, 615, 616. Rail1 may be referenced below as an unmodified rail while Rail2, Rail3, and RailN may be referenced as modified rails.

Digitized rail currents I_Rail1, I_Rail2, I_Rail3, I_RailN are summed by a summer 617, and the summed currents are divided by the number of rails (e.g., N rails) to generate an average rail current 618 (I_REF) used by each of the modified rails (e.g., Rail2, Rail3, and RailN). Each rail compares its digitized rail current with the common average rail current 618 to generate a respective reference comparison signal 619, 620, 621 that may be digitally filtered and processed by a limiter 622, 623, 624 to generate current compensation signals 625, 626, 627. Each of the current compensation signals 625, 626, 627 is summed with the raw control signal 605 to generate the modified control signals 614, 615, 616. As described herein, the current compensation signals 625, 626, 627 may be positive or negative and increase or decrease the raw control signal 605. As illustrated in FIG. 6, for a power supply with N interleaved rails, N−1 of the rails generate PWM control signals based on respective corrected compensator control signals while one of the rails (e.g., Rail1) uses the raw control signal to generate its PWM control signal.

Figure 7:
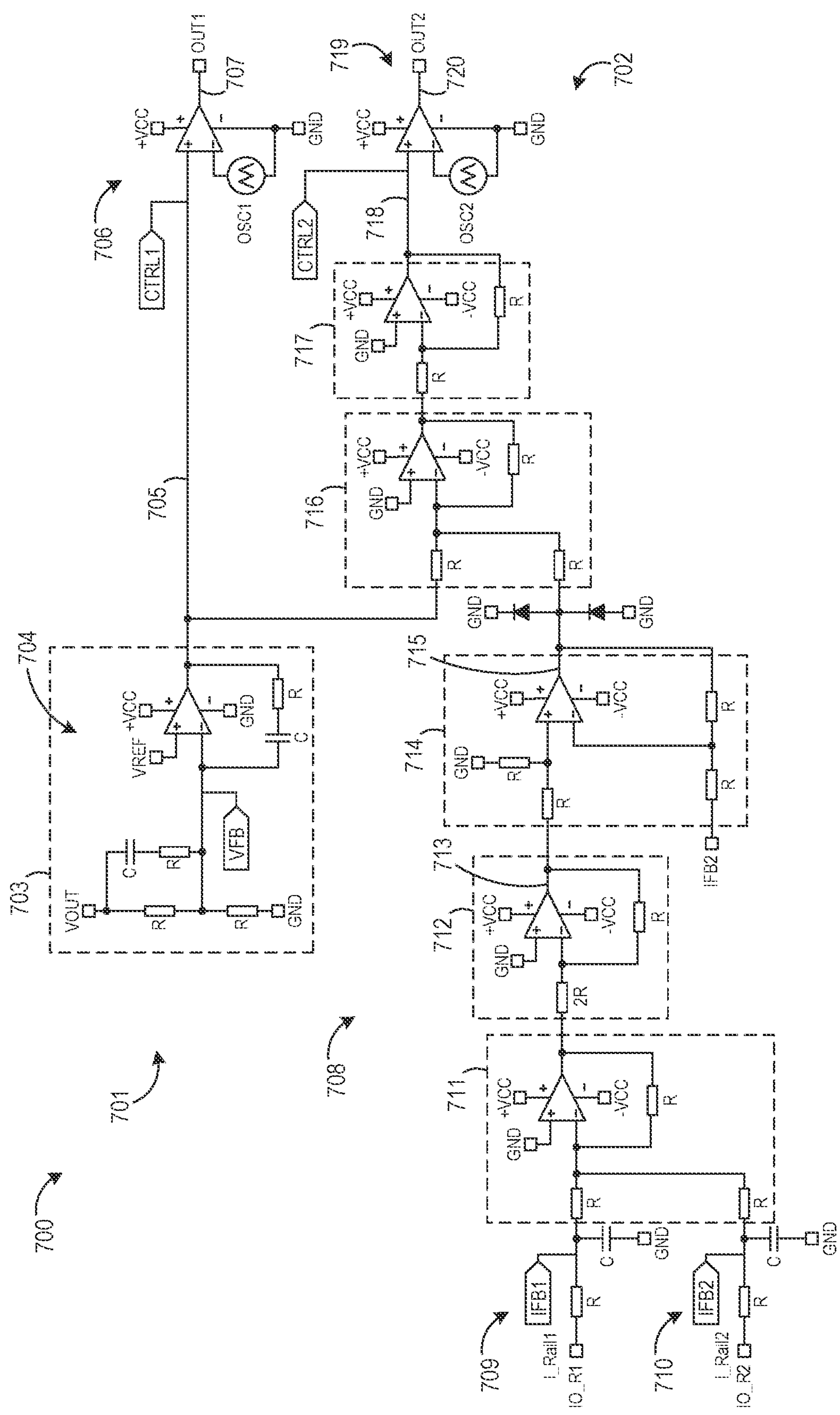
FIG. 7 is a block diagram illustrating the current balancing control scheme of FIG. 4 according to another embodiment.

FIG. 7 illustrates a block diagram illustrating a hardware implementation 700 of the current balancing control scheme of FIG. 4 with two interleaved converters usable by a multi-rail interleaved power supply according to another embodiment. The hardware implementation 700 includes two control signal generator circuit 701, 702. While two control signal generator circuits are shown, expansion to three or more signal generator circuits is easily understood based on this disclosure. A voltage loop control 703 receives an output voltage (VOUT). The output voltage is applied to a PID+Pole circuit arrangement 704 configured to generate a raw control signal 705 (CTRL1) used directly by the PWM driver 706 for generating the PWM control signal PWM control signal 707 for Rail1.

The control signal generator circuit 702 for Rail2 has a current balancing assembly 708 that includes a pair of current feedback reference circuits 709, 710 configured to generate respective current feedback reference signals IFB1, IFB2. The current feedback reference signals IFB1, IFB2 are summed via a summing amplifier 711, and an averaging amplifier 712 divides the summed signal by the number of rails (e.g., by two based on the embodiment illustrated in FIG. 7) to generate an averaged current feedback signal 713. A differential amplifier 714 generates a reference comparison signal 715 based on a comparison of the averaged current feedback signal 713 with the current feedback reference signal IFB2.

A second summing amplifier 716 of the current balancing assembly 708 sums the raw control signal 705 and the reference comparison signal 715, and an inverting amplifier 717 inverts the result to generate a modified compensator control signal 718 (CTRL2) used by the PWM driver 719 for generating the PWM control signal PWM control signal 720 for Rail2.

Figure 8:
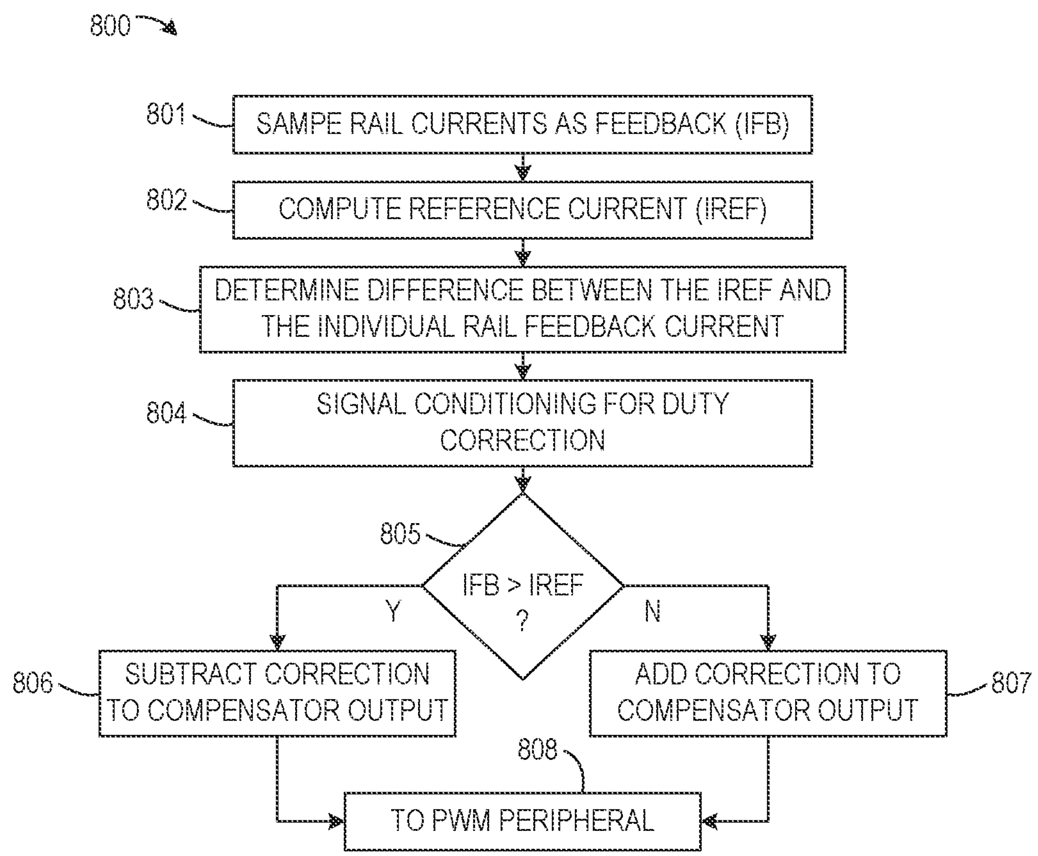
FIG. 8 is a flowchart illustrating current balancing correction according to an embodiment.

FIG. 8 illustrates a flowchart showing steps of a current balancing procedure 800 according to an embodiment. Current balancing procedure 800 begins at step 801 by sampling rail currents for each of the rails. At step 801, the procedure 800 samples rail currents for each of the rails as feedback currents (e.g., IFB1, IFB2). In one embodiment, the rail feedback currents are digitized by an analog-to-digital converter. In another embodiment, a respective resistor-capacitor filter network generates, at a node thereof, a respective filtered rail feedback current. At step 802, a common reference current (IREF) is computed based on an average of the rail feedback currents. A difference between the common reference current and one of the rail feedback currents is determined at step 803 for N−1 of the rails. For example, in an interleaved power supply having N rails, N−1 of the rails determine the difference between the common reference current and its rail feedback current. The determined difference generates a reference comparison signal for each rail.

At step 804, the reference comparison signal may be conditioned such as by a filter to apply duty correction. However, as illustrated in FIG. 4 above, signal conditioning may be applied at a later step such as after the comparison step described hereinafter. A comparison at step 805 of the conditioned reference comparison signal determines whether to add a correction to or subtract the correction from the common compensator control signal. If the respective rail feedback current is greater than the common reference current, the correction is subtracted from the common compensator control signal at step 806. If the respective rail feedback current is less than the common reference current, the correction is added to the common compensator control signal at step 807. The modified common compensator control signal is provided to the respective PWM peripheral at step 808 such as the PWM driver 406 of FIG. 4 for PWM control signal generation according to the modified signal.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A multi-rail power converter assembly comprising:

a first power converter comprising a first rail and configured to receive an input voltage and to output a first rail current on the first rail based on the input voltage;

a second power converter comprising a second rail, the second power converter interleaved with the first power converter and configured to receive the input voltage and to output a second rail current based on the input voltage; and a control driver circuit comprising:

a first control output configured to output a first control signal to control power conversion of the input voltage in the first power converter to generate the first rail current;

a second control output configured to output a second control signal to control power conversion of the input voltage in the second power converter to generate the second rail current;

a first pulse-width modulation (PWM) generator configured to receive a compensator control signal and to generate the first control signal based on the compensator control signal;

a second PWM generator configured to receive a first modified compensator control signal and to generate the second control signal based on the first modified compensator control signal; and a current balancing assembly configured to receive the compensator control signal and to generate the first modified compensator control signal;

wherein the control driver circuit is configured to generate the first modified compensator control signal based on an average of the first rail current and the second rail current; and wherein the current balancing assembly comprises:

an averaging circuit configured to generate an average current signal based on the first rail current and the second rail current;

a reference comparison circuit configured to generate a current compensation signal based on a comparison of the average current signal with the second rail current; and a compensator control signal modification circuit configured to generate the first modified compensator control signal based on the compensator control signal and the current compensation signal.

2. The multi-rail power converter assembly of claim 1, wherein the compensator control signal modification circuit is configured to generate the first modified compensator control signal based on a sum of the compensator control signal and the current compensation signal.

3. The multi-rail power converter assembly of claim 2, wherein the current compensation signal decreases the compensator control signal.

4. The multi-rail power converter assembly of claim 1 further comprising a third power converter comprising a third rail, the third power converter interleaved with the first and second power converters and configured to receive the input voltage and to output a third rail current based on the input voltage;

wherein the control driver circuit further comprises:

a third control output configured to output a third control signal configured to control power conversion of the input voltage in the third power converter to generate the third rail current; and a third PWM generator configured to receive a second modified compensator control signal and to generate the third control signal based on the second modified compensator control signal; and wherein the control driver circuit is configured to:

generate the first modified compensator control signal based on an average of the first rail current, the second rail current, and the third rail current; and generate the second modified compensator control signal based on an average of the first rail current, the second rail current, and the third rail current.

5. The multi-rail power converter assembly of claim 1, wherein each of the first and second power converters comprises a DC-DC buck converter.

6. The multi-rail power converter assembly of claim 1 further comprising a voltage output coupled to the first and second power converters and configured to supply an output voltage to a load based on the first and second rail currents.

7. The multi-rail power converter assembly of claim 6, wherein the control driver circuit further comprises a voltage loop control configured to compare a feedback voltage based on the output voltage with a reference voltage to generate the compensator control signal.

8. The multi-rail power converter assembly of claim 1, wherein the first rail current has a first average current within 1% of a target output current; and wherein the second rail current has a second average current within 1% of the target output current.

9. A method for balancing rail currents in a multi-rail power supply comprising:

generating a first pulse-width modulation (PWM) control signal based on a compensator control signal;

controlling a first power converter via the first PWM control signal to generate a first rail current based on an input voltage;

generating a second PWM control signal based on a combination of the compensator control signal with a first compensation signal;

controlling a second power converter via the second PWM control signal to generate a second rail current based on the input voltage, wherein the second power converter is interleaved with the first power converter;

generating the first compensation signal based on an average of the first and second rail currents; and combining the compensator control signal with the first compensation signal to cause a duty cycle of the second PWM control signal to decrease in response to an average current of the second rail current being greater than a target output current.

10. The method of claim 9 further comprising:

generating a third PWM control signal based on a combination of the compensator control signal with a second compensation signal;

controlling a third power converter via the third PWM control signal to generate a third rail current based on the input voltage, wherein the third power converter is interleaved with the first and second power converters; and generating the second compensation signal based on an average of the first, second, and third rail currents.

11. The method of claim 9 further comprising:

summing the first and second rail currents to generate a sum signal;

dividing the sum signal by the number of power converters to generate a current reference signal.

12. The method of claim 11 further comprising comparing the second rail current with the current reference signal to generate a reference comparison signal.

13. The method of claim 12 further comprising applying a digital filter to the reference comparison signal to generate the first compensation signal.

14. The method of claim 12 further comprising generating the first compensation signal further based on the reference comparison signal.

15. The method of claim 14 further comprising:

digitally sampling the first rail current to generate a first rail current feedback signal; and digitally sampling the second rail current to generate a second rail current feedback signal;

wherein summing the first and second rail currents comprises summing the first and second rail current feedback signals.

16. The method of claim 9 further comprising combining the compensator control signal with the first compensation signal to cause the duty cycle of the second PWM control signal to increase in response to the average current of the second rail current being less than the target output current.

17. The method of claim 16 further comprising adjusting the duty cycle of the second PWM control signal via the first compensation signal to adjust an average current of the first rail current and an average current of the second rail current to within 1% of a target output current.

18. A multi-rail power converter assembly comprising:

a first power converter comprising a first rail and configured to receive an input voltage and to output a first rail current on the first rail based on the input voltage;

a second power converter comprising a second rail, the second power converter interleaved with the first power converter and configured to receive the input voltage and to output a second rail current based on the input voltage; and a control driver circuit comprising:

a first control output configured to output a first control signal to control power conversion of the input voltage in the first power converter to generate the first rail current;

a second control output configured to output a second control signal to control power conversion of the input voltage in the second power converter to generate the second rail current;

a first pulse-width modulation (PWM) generator configured to receive a compensator control signal and to generate the first control signal based on the compensator control signal; and a second PWM generator configured to receive a first modified compensator control signal and to generate the second control signal based on the first modified compensator control signal;

wherein the control driver circuit is configured to generate the first modified compensator control signal based on an average of the first rail current and the second rail current;

wherein the first rail current has a first average current within 1% of a target output current; and wherein the second rail current has a second average current within 1% of the target output current.

* * * * *